US010046407B2

(12) United States Patent
Arakawa et al.

(10) Patent No.: US 10,046,407 B2
(45) Date of Patent: Aug. 14, 2018

(54) WIRE ELECTRIC DISCHARGE MACHINE FOR TAPER-MACHINING TILTED WORKPIECE

(75) Inventors: Yasuo Arakawa, Yamanashi (JP); Kaoru Hiraga, Yamanashi (JP); Yuji Tuboguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 940 days.

(21) Appl. No.: 13/452,999

(22) Filed: Apr. 23, 2012

(65) Prior Publication Data

US 2012/0312786 A1 Dec. 13, 2012

(30) Foreign Application Priority Data

Jun. 10, 2011 (JP) .................................. 2011-129764

(51) Int. Cl.
*B23H 1/00* (2006.01)
*B23H 7/20* (2006.01)
*B23H 7/06* (2006.01)
*G05B 19/408* (2006.01)
*B23H 11/00* (2006.01)

(52) U.S. Cl.
CPC ............... *B23H 7/20* (2013.01); *B23H 7/06* (2013.01); *G05B 19/4086* (2013.01); *B23H 1/00* (2013.01); *B23H 11/003* (2013.01); *G05B 2219/33263* (2013.01)

(58) Field of Classification Search
USPC ............ 219/69.1, 69.11, 69.12, 69.13, 69.17
See application file for complete search history.

(56) References Cited

U.S. PATENT DOCUMENTS

| 4,634,825 | A |   | 1/1987  | Budin et al.              |
|-----------|---|---|---------|---------------------------|
| 4,801,779 | A | * | 1/1989  | Obara ............ 219/69.12 |
| 4,806,720 | A | * | 2/1989  | Obara ............ 219/69.12 |
| 4,830,261 | A | * | 5/1989  | Mello et al. ....... 228/102 |
| 5,438,178 | A | * | 8/1995  | Buhler et al. ..... 219/69.12 |
| 5,563,797 | A | * | 10/1996 | Koyasu ............ 700/162 |

(Continued)

FOREIGN PATENT DOCUMENTS

| CN | 1775442 A | 5/2006  |
|----|-----------|---------|
| JP | 60255318  | 12/1985 |
| JP | 60259324  | 12/1985 |

(Continued)

OTHER PUBLICATIONS

Decision to Grant for Japanese Application No. 2012-129764 dated Sep. 11, 2012.

(Continued)

*Primary Examiner* — Dana Ross
*Assistant Examiner* — Ayub Maye
(74) *Attorney, Agent, or Firm* — Hauptman Ham, LLP

(57) ABSTRACT

In a wire electric discharge machine, a workpiece mounting unit mounts a workpiece tilted at a preset angle to a plane based on two orthogonal axes, X- and Y-axes. An XY-coordinate system is tilted at the preset angle so that it is transformed into an X'Y'-coordinate system. A machining command value commanded by a machining program is corrected based on the X'Y'-coordinate system. Thus, the tilted workpiece is taper-machined with a wire electrode kept substantially perpendicular to the XY-plane (table surface).

20 Claims, 15 Drawing Sheets

(56) References Cited

U.S. PATENT DOCUMENTS

2006/0102596 A1* 5/2006 Kinoshita et al. ......... 219/69.12
2010/0187204 A1* 7/2010 Angelella et al. ......... 219/69.13

FOREIGN PATENT DOCUMENTS

| JP | 2139129 A | 5/1990 | |
|----|-----------|--------|---|
| JP | 4057624 | 2/1992 | |
| JP | 6055354 | 3/1994 | |
| JP | 2667475 | 10/1997 | |
| JP | 09267219 A * | 10/1997 | .............. B23H 7/02 |
| JP | 9267219 A | 10/1997 | |
| JP | 10058237 | 3/1998 | |
| JP | 2000052153 A | 2/2000 | |
| JP | 2006055923 A | 3/2006 | |
| JP | 2006159396 A | 6/2006 | |

OTHER PUBLICATIONS

Office Action dated Aug. 16, 2013, corresponds to Chinese patent application No. 201210189490.5.

* cited by examiner

```
O0001(TAPER SAMPLE1)
M15;
G92X0.0Y-5.0;
G51G42G91G01X-5.0T45.0
Y60.0;
G50G40X5.0T0;
M30;
```

```
O0002(TAPER SAMPLE2);
M15;
G92X0.0Y-5.0;
G51G42G91G01X-5.0T45.0
Y30.0;
T25.0;
Y30.0;
G50G40X5.0T0;
M30;
```

FIG. 7A
FIG. 7B
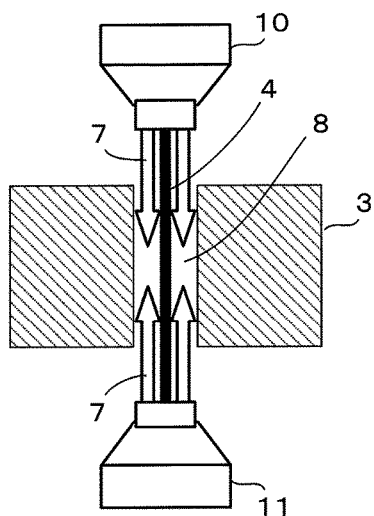
<VERTICAL MACHINING>
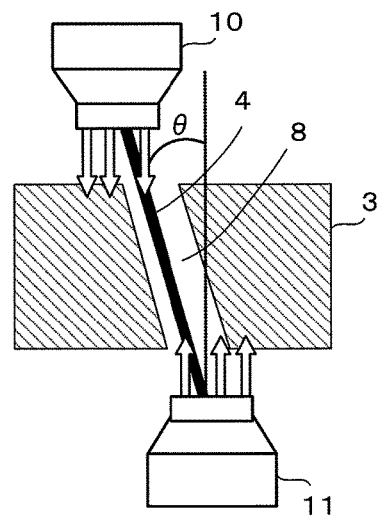
<TAPER MACHINING>

WIRE GUIDE WITH SMALL
CURVATURE RADIUS

- HARD TO BEND
- WIRE VIBRATION
- UNSTABLE MACHINING

WIRE GUIDE WITH LARGE
CURVATURE RADIUS

- EASY TO BEND
- STABLE MACHINING
- GREAT SUPPORTING
  POINT ERROR

CONVENTIONAL TAPER MACHINING

TAPER MACHINING OF INVENTION

VERTICAL MACHINING

TAPER MACHINING OF INVENTION

```
O0003(TAPER SAMPLE3);
G134W1S45.0
M15;
G92X0.0Y-5.0;
G51G42G91G01X-5.0T45.0
Y60.0;
G50G40X5.0T0;
G134W0S0;
M30;
```

```
O0004(TAPER SAMPLE4);
G134W1S35.0
M15;
G92X0.0Y-5.0;
G51G42G91G01X-5.0T45.0;
Y30.0;
T25.0;
Y30.0;
G50G40X5.0T0;
G134W0S0;
M30;
```

WIRE ELECTRIC DISCHARGE MACHINE FOR TAPER-MACHINING TILTED WORKPIECE

RELATED APPLICATIONS

The present application is based on, and claims priority from, Japanese Application Number 2011-129764, filed Jun. 10, 2011, the disclosure of which is hereby incorporated by reference herein in its entirety.

BACKGROUND OF THE INVENTION

Field of the Invention

The present invention relates to a wire electric discharge machine, and more particularly, to a wire electric discharge machine for taper-machining a tilted workpiece.

Description of the Related Art

In a conventional machining method using a wire electric discharge machine, as shown in FIG. 1, a voltage is applied to a wire electrode 4 stretched between an upper wire guide 12 in an upper nozzle 10 and a lower wire guide 13 in a lower nozzle 11, and a workpiece 3 fixed on a workpiece table 1, which is driven relative to the wire electrode 4, is moved along two axes, X- and Y-axes (not shown), which perpendicularly intersect each other on a horizontal plane. Grooving is performed to obtain a desired machining shape by melting and removing the workpiece 3 by continuous electric discharge caused (in a machining gap) between the wire electrode 4 and the workpiece 3. The workpiece 3 thus melted and removed is reduced to sludge, which is discharged from a groove by a working fluid ejected from the upper and lower nozzles 10 and 11.

An example of conventional taper machining will be described with reference to FIGS. 2 to 5. In this example, as shown in FIG. 3, a member having a 45-degree slope is cut out of a cuboid workpiece.

In taper-machining the cuboid workpiece shown in FIG. 3, the horizontal position (XY-position) of the upper wire guide 12 relative to the lower wire guide 13 is shifted so that the wire electrode 4 is stretched obliquely relative to a workpiece mounting surface (not shown). This taper machining is a well-known method used to obtain a conical or quadrangular pyramidal shape or some other shape with arbitrary slopes.

The amount of movement of the upper wire guide 12 relative to the lower wire guide 13 can be determined by calculation. In general, the upper and lower wire guides are formed of members called "die guides" or "wire die guides" having guide holes through which the wire electrode 4 is passed.

In a machining program (O0001) shown in FIG. 4, a taper machining function is enabled by a command code M15, and a coordinate system for machining programs and a machining start point (0,−5) are set by G92. At the machining start point, the wire electrode 4 is in a posture perpendicular to a table surface (XY-plane). In response to a command G01X-5.0, the wire electrode 4 starts to move toward a point A. The moment this movement is started, the posture of the wire electrode 4 starts to tilt to prepare for slope machining in the next block (linear block A-B shown in FIG. 3), in response to commanded G51 (command for a leftward tilt of the wire) and T45.0 (in which T is a command for a tilt angle of the wire electrode 4). The tilt angle of the wire electrode 4 becomes 45° when the point A is reached.

When Y60.0 is then commanded, the wire electrode 4 is kept at 45° on the left side with respect to the direction of movement as it starts and continues slope machining and advances to a point B. Finally, in response to a command X5.0, the wire electrode 4 starts to move toward a machining end point. The moment this movement is started, the tilt of the wire electrode 4 starts to be gradually restored to its original angle in response to commanded G50 (command for canceling the tilt of the wire electrode 4) and T0. When the wire electrode 4 reaches the machining end point, it is restored to its vertical state (with the tilt angle at 0°), whereupon the machining ends.

While the workpiece has a single taper angle in the example described above, a workpiece having a plurality of taper angles is machined in the following manner.

In machining the workpiece with two different tapers of 45° and 25°, as shown in FIG. 5, the wire electrode 4 is tilted at 45° at the maximum from the vertical state according to the conventional taper machining. FIG. 6 shows a program example (O0002) for machining of the workpiece with the tapers of 45° and 25°.

The taper machining function is enabled by the command code M15, and the coordinate system for the machining programs and the machining start point (0,−5) are set by G92. At the machining start point, the wire electrode 4 is in a posture perpendicular to the table surface (XY-plane). In response to the command G01X-5.0, the wire electrode 4 starts to move toward the point A. The moment this movement is started, the posture of the wire electrode 4 starts to tilt to prepare for slope machining in the next block (linear block A-C shown in FIG. 5), in response to the commanded G51 and T45.0. The tilt angle of the wire electrode 4 becomes 45° when the point A is reached by the wire electrode 4.

When Y30.0 is then commanded, the wire electrode 4 is kept at 45° on the left side with respect to the direction of movement as it starts and continues slope machining and advances to a point C. When the wire electrode 4 reaches the point C, its tilt angle becomes 25° in response to a command T25.0. When Y30.0 is then commanded, the wire electrode 4 is kept at 25° with respect to the direction of movement as it starts and continues slope machining and advances to the point B. Finally, in response to the command X5.0, the wire electrode 4 starts to move toward the machining end point. The moment this movement is started, the tilt of the wire electrode 4 starts to be gradually restored to its original angle in response to the commanded G50 and T0. When the wire electrode 4 reaches the machining end point, its posture is restored to the vertical state (with the tilt angle at 0°), whereupon the machining ends.

As described above, the necessary tilt angle of the wire electrode 4 for the execution of the taper machining corresponds to the tilt angle (taper angle) of a machined surface and is usually designated by a numerical value in a machining program. With the workpiece mounting surface assumed to be on the XY-plane (Z=0), for example, the tilt angle is designated as follows:

"45° to Z-direction=T45.0", or

"25° to Z-direction=T25.0".

In order to adjust the actual tilt of the wire electrode 4 to the designated tilt angle, the position (relative XY-position) of the upper wire guide 12 relative to the lower wire guide 13 is shifted from a position where the wire guides 12 and 13 are vertically aligned to a position where the wire electrode 4 correctly extends along a plane with the programmed tilt. This movement of the wire electrode 4 is achieved by moving (along a U-axis parallel to the X-axis and a V-axis parallel to the Y-axis) a drive unit that supports one (e.g., upper wire guide 12) of the wire guides 12 and 13.

(1) Japanese Patent Application Laid-Open No. 2-139129 discloses a method of parallelism correction for a wire electric discharge machine, whereby the parallelism of a workpiece on an XY-table relative to the X- and Y-axes is corrected. In this correction method, the workpiece is mounted on the table, its parallelism is measured, and the wire guide is moved based on the resulting measured value so that the wire electrode extends perpendicular to the workpiece. According to this correction method, the mounting of the workpiece need not be adjusted, so that labor and time for adjustment can be saved and machining setup can be considerably simplified. For machining, moreover, a controller is provided with correction means, and the distance covered by the relative movement of the workpiece and the wire electrode is adjusted to a command value. Thus, accurate machining can be achieved.

Specifically, the above-described patent document discloses a technique for correcting the parallelism so that the wire electrode extends perpendicular to the workpiece mounted on at an arbitrary angle on the surface of the table, thereby transforming a coordinate system for machining programs, and performing wire electric discharge machining according to the corrected machining command value, based on the transformed coordinate system. This technique is characterized in that even if the workpiece is mounted at any angle on the table surface, machining can be achieved in the same manner as in the case where the workpiece is mounted parallel on the table surface. However, this technique is designed to enable machining without a complicated setup operation after the workpiece is mounted on the table and is based on the assumption that the workpiece is mounted on the table surface. In this document, there is neither description nor suggestion of various adverse effects in taper machining, as well as of how the workpiece is mounted at a deliberate angle on the table surface.

(2) Japanese Patent Application Laid-Open No. 2000-52153 discloses a technique to devise the shape of a wire guide, thereby solving the problems of disconnection of a wire electrode and streaks formed on a machined surface during taper machining. However, the technique disclosed in this patent document relates to the shape of a wire guide that is based on the assumption that the wire electrode is stretched at an angle. Therefore, the above countermeasure is unnecessary if the wire electrode is stretched perpendicular to the table surface.

(3) Japanese Patent Application Laid-Open No. 2006-55923 discloses a technique to devise the shape of a wire guide so that a good machined surface can be obtained and lest a wire electrode vibrate even during wide-angle taper machining. However, the technique disclosed in this patent document also relates to the shape of a wire guide that is based on the assumption that the wire electrode is stretched at an angle. Therefore, the above countermeasure is unnecessary if the wire electrode is stretched perpendicular to the table surface.

(4) Japanese Patent Application Laid-Open No. 9-267219 discloses a wire electric discharge machine and control means configured to control the machine by numerical control. The wire electric discharge machine has a taper machining function and comprises a rotary indexing axis capable of indexing and positioning. This machine uses a machining device capable of automatically machining a forming tool having a desired cutting edge shape with high efficiency and high accuracy. The machining device machines a cutting edge forming portion of the material on which a basic shape has already been machined so as to obtain a desired cutting edge shape and a flank face. The material of the forming tool is mounted as a workpiece on the rotary indexing axis of the wire electric discharge machine. Electric discharge machining of a cutting edge and a flank face on the cutting edge forming portion of the forming tool is automatically performed by controlling the relative movement of a wire electrode and the workpiece, based on a numerical control program created according to the desired cutting edge shape to be obtained in advance.

In the technique disclosed in the patent document described above, the workpiece is mounted on the rotary axis parallel to a table surface, and the rotary axis is rotated as the cutting edge shape and the flank face are machined. Since the workpiece itself moves around the rotary axis, however, this technique is not designed to correct a coordinate system or a command value for machining in accordance with the tilt of the workpiece. Taper machining is based on a conventional system such that an orthogonal coordinate system based on the table surface is used, and the wire electrode for the taper machining is tilted relative to its vertical running posture.

(5) Japanese Patent Application Laid-Open No. 2006-159396 discloses a technique in which three-dimensional positions of three points that are not on a single straight line on the upper surface of a workpiece is measured, a direction perpendicular to the tilted workpiece is calculated based on the three measured points, and a wire electrode is positioned so that it extends perpendicular to the workpiece. Based on this, according to this technique, moreover, the position of the wire electrode is controlled to determine a tilt commanded by a machining program, whereby an error produced when the workpiece is set in position is corrected.

In order to correct an error in the posture of the workpiece to be mounted, according to the technique disclosed in the patent document described above, however, the vertical position of the wire electrode is adjusted so that the wire electrode extends perpendicular to the workpiece. This technique is not designed to deliberately tilt the workpiece to be taper-machined so that the wire electrode extends substantially perpendicular to a table surface.

In the case of the wire electric discharge machine, the taper machining in which the wire electrode 4 supported by the wire guide portion is stretched obliquely by translating the upper wire guide 12 relative to the table surface involves more technical problems than vertical machining in which the wire electrode 4 is stretched vertically. For example, the problems are as follows:

(I) The machining speed cannot be increased due to difficulty in discharging sludge.

(II) The wire guide applies frictional force to the wire electrode, thereby adversely affecting the machining accuracy (surface roughness).

(III) Since supporting points of the wire electrode bent by the wire guide vary depending on the shape precision and machining state of the wire guide, high-precision machining is difficult.

(IV) It is difficult to set machining conditions.

(V) In some cases, the wire electrode 4 may inevitably exceed movable ranges of the upper and lower wire guides 12 and 13, so that the workpiece cannot be machined.

The following is an explanation of the above problems (I) to (V).

(I) The machining speed cannot be increased due to difficulty in discharging sludge:

In the wire electric discharge machining, electric discharge between the wire electrode 4 and the workpiece 3 is repeated as the workpiece 3 is melted and removed around the wire electrode 4. Thus, a machining groove 8 is formed as machining advances. FIGS. 7A and 7B show relationships between the wire electrode 4, workpiece 3, and working fluid 7 during the taper machining.

During the wire electric discharge machining, the working fluid 7 is ejected from the upper and lower nozzles 10 and 11 to discharge sludge from the machining groove 8 between the wire electrode 4 and the workpiece 3, thereby preventing short-circuiting between the wire electrode 4 and the workpiece 3 or disconnection of the wire electrode 4. Thus, the workpiece 3 can be efficiently machined.

FIGS. 7A and 7B are diagrams illustrating relationships between the wire electrode 4, workpiece 3, and working fluid 7.

In the vertical machining, the wire electrode 4 is stretched perpendicular to the table surface (not shown), as shown in FIG. 7A. In this case, the ejecting direction of the working fluid 7 is coincident with the running direction of the wire electrode 4, so that the working fluid 7 can smoothly flow into the machining groove 8, thereby efficiently discharging the sludge from the groove 8.

In the taper machining, in contrast, the wire electrode 4 is stretched obliquely relative to the table surface, as shown in FIG. 7B. In this taper machining, the ejecting direction of the working fluid 7 is not coincident with the running direction of the wire electrode 4, so that the working fluid 7 cannot easily flow into the machining groove 8, and therefore, the sludge cannot be efficiently discharged from the machining groove 8. The greater the tilt angle θ, the more distinct this tendency is. The table surface is perpendicular to the drawing plane of FIG. 7 and parallel to the bottom surface of the workpiece 3.

In the taper machining, moreover, the wire electrode 4 is bent by the wire guide portion as it runs, so that it may sometimes interfere with the nozzles 10 and 11 that guide the working fluid 7 for straight ejection. Accordingly, it is necessary to use nozzles with large inside diameters such that the flow velocity of the working fluid of the same flow volume is reduced.

In the case of the taper machining, therefore, the sludge discharge efficiency is degraded, so that short-circuiting or disconnection of the wire electrode 4 easily occurs. Accordingly, electric discharge machining conditions must be eased, so that machining cannot be performed at high speed.

(II) The wire guide applies frictional force to the wire electrode, thereby adversely affecting the machining accuracy (surface roughness):

In the taper machining in which the wire electrode 4 is stretched obliquely relative to the table surface as it is machined, the wire electrode 4 is suddenly bent at the wire guide portion, so that it cannot smoothly move in wire guide holes. Thus, the wire electrode 4 may be caused to vibrate and disconnected. Consequently, a machined surface may be streaked, so that the surface roughness is degraded. The greater the taper angle, the more distinct this tendency is.

In order to solve these problems, according to the techniques disclosed in Japanese Patent Application Laid-Open Nos. 2000-52153 and 2006-55923, an attempt is made to devise the shape of the wire guide portion to suppress vibration of the wire electrode 4. However, frictional force produced between the wire electrode 4 and the wire guide portion still cannot be completely eliminated.

As shown in FIGS. 8A and 8B, therefore, it is impossible to completely suppress the vibration to be produced in the wire electrode 4. FIGS. 8A and 8B are diagrams illustrating how the wire electrode is bent by the wire guide portion in the taper machining.

FIG. 8A is a diagram illustrating how the wire electrode 4 is bent at the wire guide portion when a wire guide 13a with a small curvature radius is used. If the wire guide of this type is used, the wire electrode 4 cannot be easily bent, so that its vibration cannot be suppressed, and hence, the electric discharge machining is unstable. On the other hand, FIG. 8B is a diagram illustrating how the wire electrode 4 is bent at the wire guide portion when a wire guide 13b with a large curvature radius is used. If the wire guide of this type is used, the wire electrode 4 easily bends, so that the machining is stable. In this case, however, supporting points are subject to a large error, which is a substantial problem, as described later.

(III) Since supporting points of the wire electrode bent by the wire guide vary depending on the shape precision and machining state of the wire guide, high-precision machining is difficult:

An angle command method for the taper machining will be described with reference to FIG. 9. The amount of movement of the upper wire guide 12 can be calculated based on the tilt angle θ of the wire electrode 4 and a distance H between the upper and lower wire guides 12 and 13. In the case of the technique disclosed in Japanese Patent Application Laid-Open No. 2006-55923 described before, the vibration of the wire electrode 4 can be reduced by using a wire guide with a large curvature radius. In this case, however, a supporting point error occurs causing a great problem regarding precision. FIG. 10 is a diagram illustrating a supporting point error produced in the wire guide with a large curvature radius. Since the supporting point positions of the wire electrode 4 vary depending on the taper angle, as shown in FIG. 10, the tilt angle (taper angle) of the wire electrode 4 is deviated unless the supporting point error is corrected.

(IV) It is difficult to set machining conditions:

In the case of the taper machining by means of the wire electric discharge machine, which has been described in connection with the problem (I), the sludge discharge efficiency is degraded, so that short-circuiting or disconnection of the wire electrode 4 easily occurs. Conventionally, the electric discharge machining conditions must be eased to overcome this. If the machining conditions are eased, however, the machining speed is reduced correspondingly, resulting in an increase in machining time, although the possibility of disconnection of the wire electrode 4 is reduced. Thus, efficient electric discharge machining is expected to be performed without easing the machining conditions, if possible.

Since the sludge discharge efficiency varies depending on the taper angle, however, it is actually very difficult to adjust the degree to which the machining conditions are eased for the angle concerned.

(V) In some cases, the wire electrode 4 may inevitably exceed movable ranges of the upper and lower wire guides 12 and 13, so that the workpiece cannot be machined:

If the wire electrode 4 is tilted relative to the table surface such that the commanded taper angle is great or if the distance between the upper and lower wire guides 12 and 13 is long, as shown in FIG. 11, the amount of movement of the guide 12 and/or 13 increases. Thus, the movable range of the guide may be exceeded so that machining is prevented.

The above-described problems (I) to (V) are caused when the wire electrode 4 is stretched obliquely. The greater the taper angle, the more prominent these problems tend to be.

SUMMARY OF THE INVENTION

Accordingly, the object of the present invention is to provide a wire electric discharge machine capable of performing taper machining in which a wire electrode is stretched vertically or substantially vertically to such a degree as to prevent or reduce adverse effects in the taper machining.

The wire electric discharge machine according to the present invention is provided with a table having a flat surface and a coordinate system based on two orthogonal axes and adapted to carry a workpiece thereon and which performs electric discharge machining while relatively moving a wire electrode and the workpiece according to a machining program for taper machining. The wire electric discharge machine comprises: a mounting unit configured to mount the workpiece at an angle to the flat surface; a tilt angle setting unit configured to set a tilt angle of the workpiece, mounted on the mounting unit at an angle to the flat surface, with respect to the flat surface; a coordinate system transformation unit configured to transform the coordinate system by tilting the coordinate system based on the tilt angle set by the tilt angle setting unit; and a machining command value correction unit configured to correct a machining command value commanded by the machining program, based on the coordinate system transformed by the coordinate system transformation unit.

If a single taper angle is commanded by the machining program, the angle at which the workpiece is tilted relative to the flat surface by the mounting unit may be equal to or in the vicinity of the angle of a taper portion commanded by the machining program.

If a plurality of taper angles are commanded by the machining program, the angle at which the workpiece is tilted relative to the flat surface by the mounting unit may be equal to or in the vicinity of an angle intermediate between maximum and minimum values of the taper angle.

The mounting unit may be an adjustable-angle index machine, a rotary axis having an indexing and positioning function, or a fixing jig having a sine-bar structure.

The wire electric discharge machine may further comprise a machining condition storage unit configured to store machining conditions prepared for each plate thickness of the workpiece, a plate thickness correction unit configured to correct the plate thickness of the workpiece based on the tilt angle set by the tilt angle setting unit, and a machining condition setting unit configured to set the machining conditions based on the plate thickness corrected by the plate thickness correction unit.

The machining command value correction unit may calculate an angle difference between a commanded taper angle and a current angle of the wire electrode on the coordinate system transformed by the coordinate system transformation unit, and a wire guide may be moved based on the calculated angle difference.

According to the present invention, there may be provided a wire electric discharge machine capable of performing taper machining in which a wire electrode is stretched vertically or substantially vertically to such a degree as to prevent or reduce adverse effects in the taper machining. Thus, according to the present invention, a workpiece is rotated as it is set in place, the position of the wire electrode is controlled so that a taper angle is an angle as commanded with respect to a direction perpendicular to the workpiece, and the rotation angle of the workpiece is made substantially equal to the commanded taper angle. In this way, the wire electrode can be kept substantially perpendicular to a table surface during the machining, so that conventional adverse effects in the taper machining can be avoided.

BRIEF DESCRIPTION OF THE DRAWINGS

The above and other objects and features of the present invention will be obvious from the ensuing description of embodiments with reference to the accompanying drawings, in which:

FIGS. 7A and 7B are diagrams illustrating relationships between a wire electrode, workpiece, and working fluid during the taper machining;

FIGS. 8A and 8B are diagrams illustrating how the wire electrode is bent by a wire guide portion in the taper machining, in which FIG. 8A shows a wire guide with a small curvature radius, and FIG. 8B shows a wire guide with a large curvature radius;

DETAILED DESCRIPTION OF THE PREFERRED EMBODIMENTS

An outline of a wire electric discharge machine according to the present invention will be described first.

According to the established technique described in Japanese Patent Application Laid-Open No. 2-139129 mentioned before, a coordinate system for machining programs is transformed by correcting the parallelism of a workpiece 3 with respect to a plane defined by X- and Y-axes so that the wire electrode 4 extends perpendicular to the workpiece 3 mounted on at an arbitrary angle on a table surface, a machining command value is corrected based on the transformed coordinate system, and wire electric discharge machining is performed according to the corrected machining command value. In other words, according to this technique, even if the workpiece 3 is mounted at any angle on the table surface, machining can be achieved in the same manner as in the case where the workpiece 3 is mounted parallel on the table surface.

The wire electric discharge machine according to the present invention is designed to perform taper machining based on the above technique. Specifically, the taper machining is performed in such a manner that the wire electrode 4 is stretched perpendicular or substantially perpendicular to the table surface to such a degree as to prevent or reduce adverse effects in the taper machining. In this state, the taper machining is performed with the workpiece 3 mounted obliquely relative to the table surface instead of tilting the wire electrode 4.

In this way, the problems to be solved by the present invention are solved, and the performance of the taper machining is rapidly improved. Since the machining programs for conventional taper machining can be used intact, moreover, it is unnecessary to take trouble to review or create machining programs for the case where the workpiece 3 is mounted obliquely.

The following is a discussion as to how to machine the workpiece 3 in a tilted posture.

Even though the workpiece 3 is tilted in place of the wire electrode 4, machining similar to the conventional taper machining is supposed to be achieved only if the positional relationship between the wire electrode 4 and the workpiece 3 is unchanged.

However, one problem occurs here. If the angle between the table surface and the workpiece 3 is θ, as shown in FIG. 12, and if the amount of movement of the wire electrode 4 on the table surface and the amount of relative movement of the wire electrode 4 with respect to the workpiece 3 are L and L', respectively, the relationship between L and L' can be given as follows:

$$L' = L \times \cos \theta. \quad (1)$$

Figure 12:
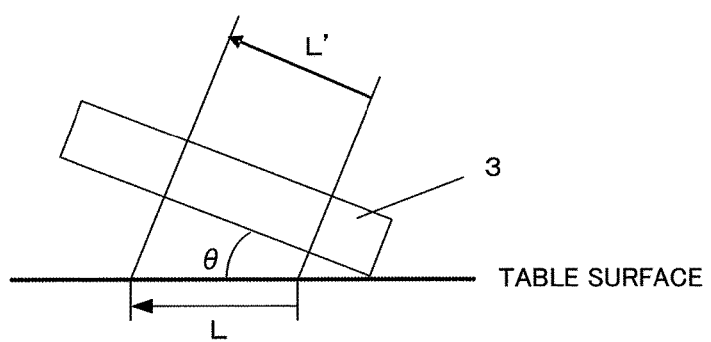
FIG. 12 is a diagram illustrating the amount of relative movement of the wire electrode with respect to the workpiece tilted relative to a surface of a table.

FIG. 12 illustrates the amount of relative movement of the wire electrode 4 and the tilted workpiece 3.

Since θ=0° in the case where the workpiece 3 is mounted parallel to the table surface, as in the conventional case, L'=L is obtained according to the above equation, that is, the amount of relative movement of the wire electrode 4 with respect to the workpiece 3 is equal to the amount of movement of the wire electrode 4 on the table surface. In the case where the workpiece 3 is mounted obliquely on the table surface, in contrast, the table must be moved with the amount of movement L' corrected to L according to equation (1) when L' is commanded by a machining program.

Since correction processing for the machining command value to solve this problem is described in, for example, Japanese Patent Application Laid-Open No. 2-139129 mentioned before, the wire electric discharge machine according to the present invention can use this correction processing.

Conventionally, there has been an idea to perform electric discharge machining (taper machining) such that only the workpiece 3 is tilted with the wire guide kept vertical. In this case, however, a machining program for machining the tilted workpiece 3 must be recreated, which is not practical due to required labor. However, a machining program for conventional taper machining can be used intact by combining a tilted coordinate system with the correction processing, so that additional labor is unnecessary.

The following is a discussion regarding the problems (I) to (V) described before.

Figure 13A:
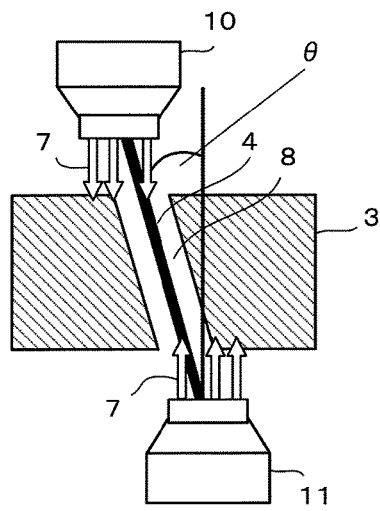
FIGS. 13A and 13B are diagrams comparatively illustrating the conventional taper machining and the taper machining according to the present invention, respectively.
Figure 13B:
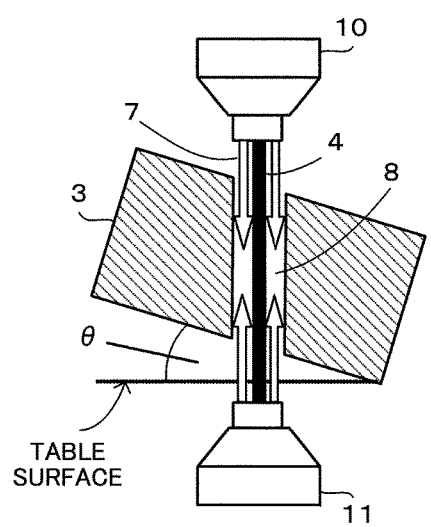

(I) The machining speed cannot be increased due to difficulty in discharging sludge:

FIGS. 13A and 13B are diagrams comparatively illustrating the conventional taper machining and the taper machining according to the present invention, respectively.

In the conventional taper machining, as shown in FIG. 13A, the wire electrode 4 is tilted at the taper angle (θ) from a position perpendicular to the table surface. According to the present invention, in contrast, the workpiece 3 is tilted at the taper angle (θ) from the table surface, as shown in FIG. 13B. In this case, however, the positional relationship between the wire electrode 4 and the workpiece 3 is the same as in the case of the conventional taper machining (shown in FIG. 13A).

According to the present invention, however, the wire electrode 4 is kept perpendicular to the table surface, as shown in FIG. 13B. As in the case of the vertical machining, therefore, the working fluid 7 smoothly flows into the machining groove between the wire electrode 4 and the workpiece 3. According to the present invention, therefore, sludge can be efficiently discharged, so that the problem that "the machining speed cannot be increased due to difficulty in discharging sludge" can be solved, and a machining speed equivalent to that of the vertical machining can be obtained. Thus, the machining time can be reduced considerably.

(II) The wire guide applies frictional force to the wire electrode, thereby adversely affecting the machining accuracy (surface roughness):

If the wire electrode 4 can be kept perpendicular to the table surface, it cannot be suddenly bent by the wire guide portion, so that the problem that "the wire guide applies frictional force to the wire electrode, thereby adversely affecting the surface roughness" can be solved, and a surface roughness equivalent to that of the vertical machining can be obtained.

(III) Since supporting points of the wire electrode bent by the wire guide vary depending on the shape precision and machining state of the wire guide, high-precision machining is difficult:

If the wire electrode 4 can be kept perpendicular to the table surface, it cannot be suddenly bent by the wire guide portion, so that the problem that "supporting points of the wire guide are deviated at the wire guide portion, thereby adversely affecting the precision" can be solved, and a precision equivalent to that of the vertical machining can be obtained.

(IV) It is difficult to set machining conditions:

Although the machining conditions for wire electric discharge machining are normally provided for each plate thickness of the workpiece 3 to be vertically machined, those for taper machining are not prepared. This is because it is very difficult to determine optimum conditions for taper machining for the aforementioned reasons.

Figure 14A:
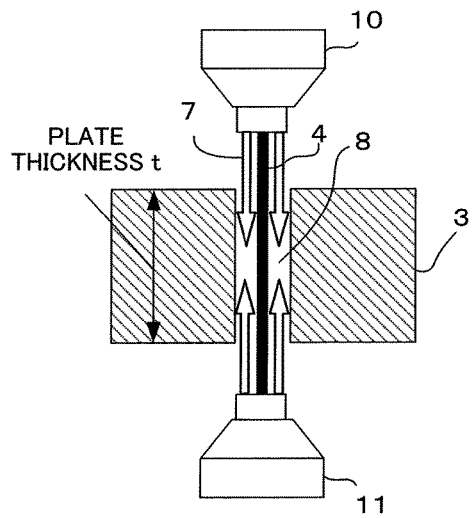
FIGS. 14A and 14B are diagrams illustrating the relationship between a plate thickness for vertical machining (FIG. 14A) and that for the taper machining according to the present invention (FIG. 14B)
Figure 14B:
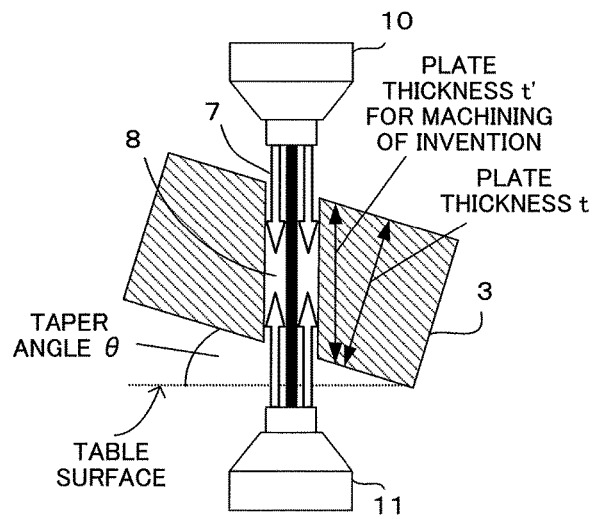

In the wire electric discharge machining according to the present invention, however, the wire electrode 4 is kept perpendicular to the table surface, so that the sludge discharge capacity is equivalent to that for the vertical machining. As shown in FIGS. 14A and 14B, therefore, if the "plate thickness for machining according to the present invention" and the original plate thickness of the workpiece 3 are t' and t, respectively, the relationship between t and t' can be given as follows:

$$t' = t/\cos\theta. \tag{2}$$

FIGS. 14A and 14B illustrate the relationship between the plate thickness t (FIG. 14A) of the workpiece 3 for the vertical machining and the plate thickness ("plate thickness for machining according to the present invention") t' (FIG. 14B) for the taper machining by the wire electric discharge machining according to the present invention, respectively.

The above description indicates that taper machining conditions can be obtained by determining the "plate thickness t' for machining according to the present invention" based on the plate thickness t and taper angle $\theta$ of the workpiece 3 and setting "vertical machining conditions based on the assumption that the plate thickness of the workpiece 3 is t'". In case where the taper machining according to the present invention is to be performed, an operator can set the taper machining conditions by using taper machining condition setting means that is provided in the controller of the wire electric discharge machine. Thus, according to the wire electric discharge machining of the present invention, taper machining with a very high efficiency equivalent to that for the vertical machining can be performed without requiring the conventional labor for setting the machining conditions.

(V) In some cases, the wire electrode 4 may inevitably exceed movable ranges of the upper and lower wire guides 12 and 13, so that the workpiece cannot be machined:

In the wire electric discharge machining according to the present invention, the wire electrode can be kept substantially perpendicular to the table surface as it is machined, so that most of the adverse effects in the taper machining can be avoided.

Figures 3, 4:
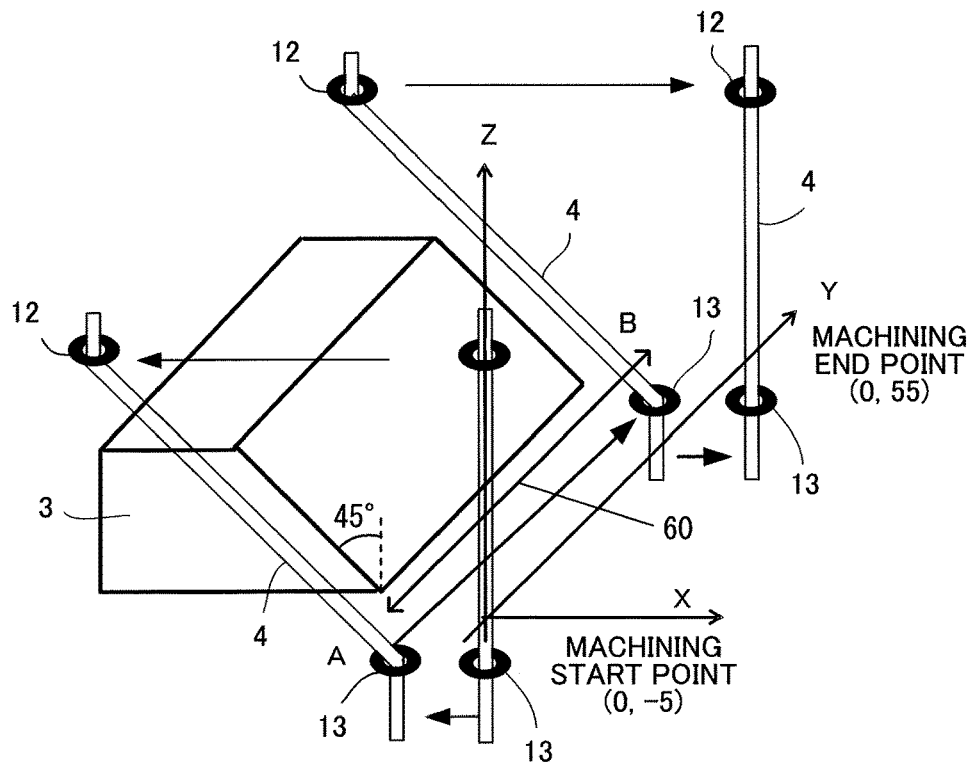
FIG. 3 is a diagram illustrating the operation of the wire electrode for the taper machining shown in FIG. 2.
FIG. 4 shows an example of a machining program for the taper machining shown in FIG. 3.

The taper machining performed by the wire electric discharge machine according to the present invention will now be described with reference to FIG. 15. In the arrangement shown in FIG. 15, the workpiece 3 of FIG. 3 is rotated by 45° about the Y-axis, and a three-axis orthogonal coordinate system based on X'-, Y'-, and Z'-axes is newly provided in addition to the three-axis orthogonal coordinate system of FIG. 3 based on X-, Y-, and Z-axes. In this case, the Y'-axis is coincident with the Y-axis.

Figures 15, 16:
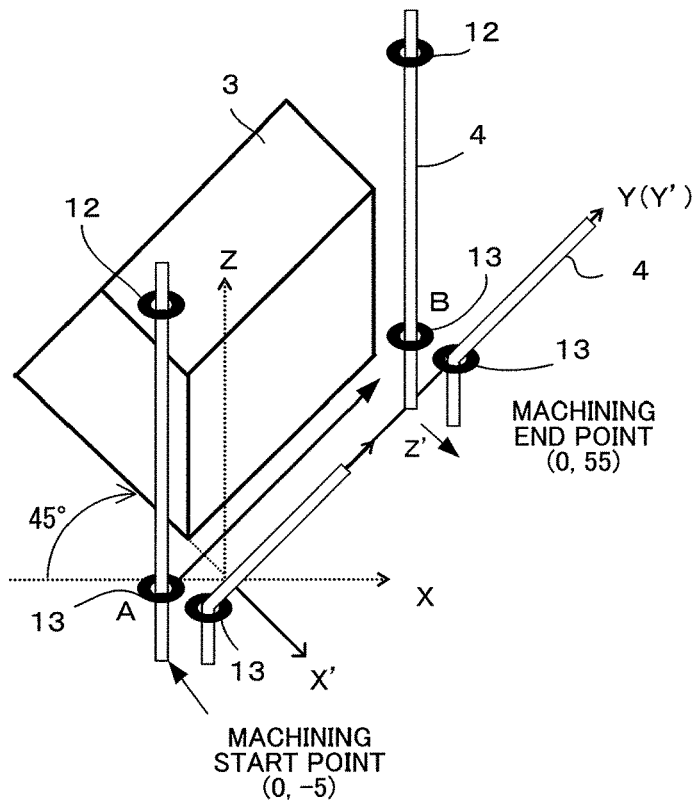
FIG. 15 is a diagram illustrating the taper machining performed by a wire electric discharge machine according to the present invention, in which the workpiece to be taper-machined has a single taper angle.
FIG. 16 shows an example of a machining program for the taper machining shown in FIG. 15.

As seen from FIG. 15, the workpiece 3 is rotated about the Y-axis to be tilted at 45° from the table surface (XY-plane) of the machine. When the aforesaid machining program is executed based on the X'Y'Z'-coordinate system, the linear block A-B having been conventionally machined as a 45° slope, as shown in FIG. 3, is a surface perpendicular to the table surface in the case of the taper machining according to the present invention shown in FIG. 15. This coordinate system can be transformed by only creating a machining program (O0003) shown in FIG. 16, which comprises G134W1 and G134W0 added to the conventional machining program (O0001) shown in FIG. 4.

The following is a description of a motion based on the machining program (O0003) shown in FIG. 16.

First, a coordinate system transformation function is enabled by the command G134W1. A coordinate system tilt angle is commanded by S. Thereupon, the X'Y'Z'-coordinate system for taper machining is set, and the wire electrode 4 is tilted perpendicular to an X'Y'-plane at the machining start point. Since S45.0 is given in this case, the coordinate system is tilted at 45°.

If the wire electrode 4 becomes perpendicular to the X'Y'-plane, M15 is commanded so that the taper machining function is enabled, and the coordinate system for the machining programs and the machining start point (0,−5) are set by G92. At the machining start point, the wire electrode 4 extends perpendicular to the X'Y'-plane.

In response to the command G01X-5.0, the wire electrode 4 starts to move toward the point A. In response to G51 and T45.0 commanded at the same time with G01X-5.0, the posture of the wire electrode 4 starts to change so as to be perpendicular to the table surface (XY-plane) to prepare for machining in the next block (linear block A-B). When the point A is reached, the wire electrode 4 extends perpendicular to the table surface.

When Y60.0 is then commanded, the wire electrode 4 advances to the point B without changing its posture. Then, in response to a command X5.0, the wire electrode 4 starts to move toward the machining end point. In response to G50 and T0 commanded at the same time with X-5.0, the posture of the wire electrode 4 starts to be gradually restored so that it is perpendicular to the X'Y'-plane. When the machining end point is reached, the wire electrode 4 is restored to the state where it extends perpendicular to the X'Y'-plane.

Finally, the coordinate system transformation function is disabled by the command G134W0, and the wire electrode 4 is restored to the state where it extends perpendicular to the table surface, whereupon the processing ends.

Figures 5, 6:
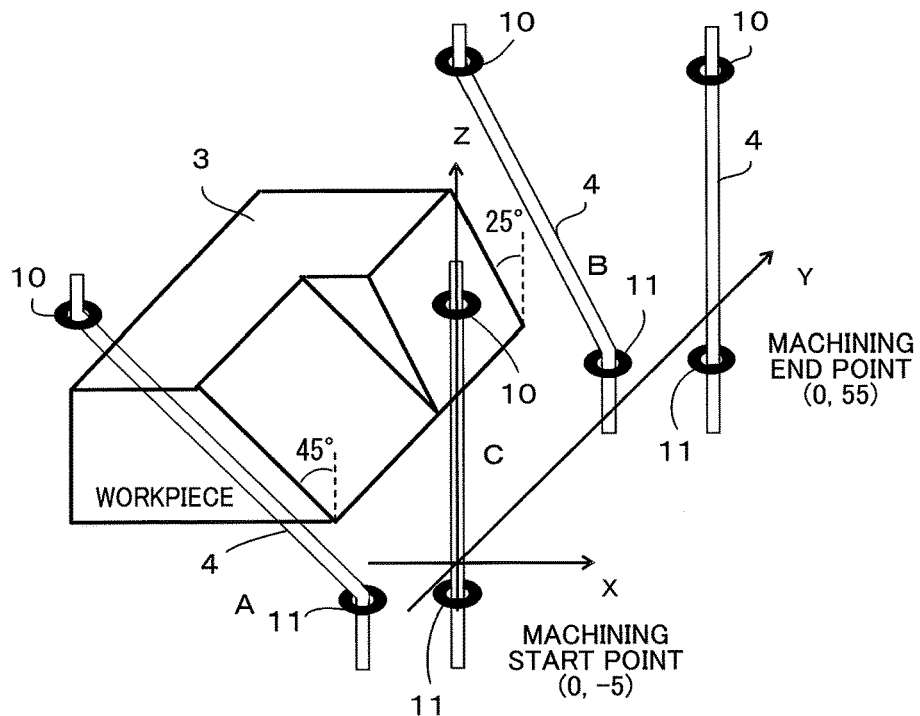
FIG. 5 is a diagram illustrating taper machining of a workpiece having a plurality of taper angles.
FIG. 6 shows an example of a machining program for the taper machining shown in FIG. 5.
Figure 8A:
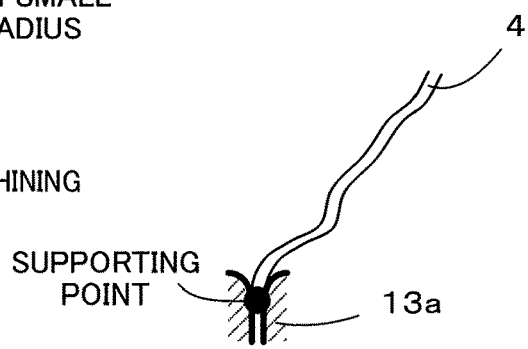
Figure 8B:
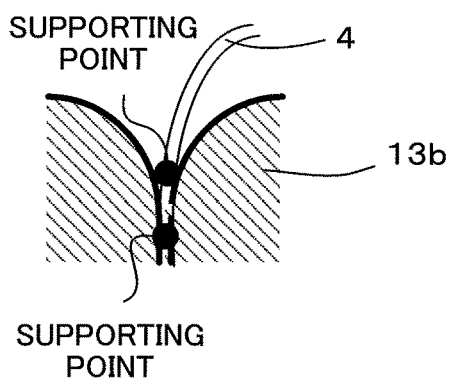
Figure 9:
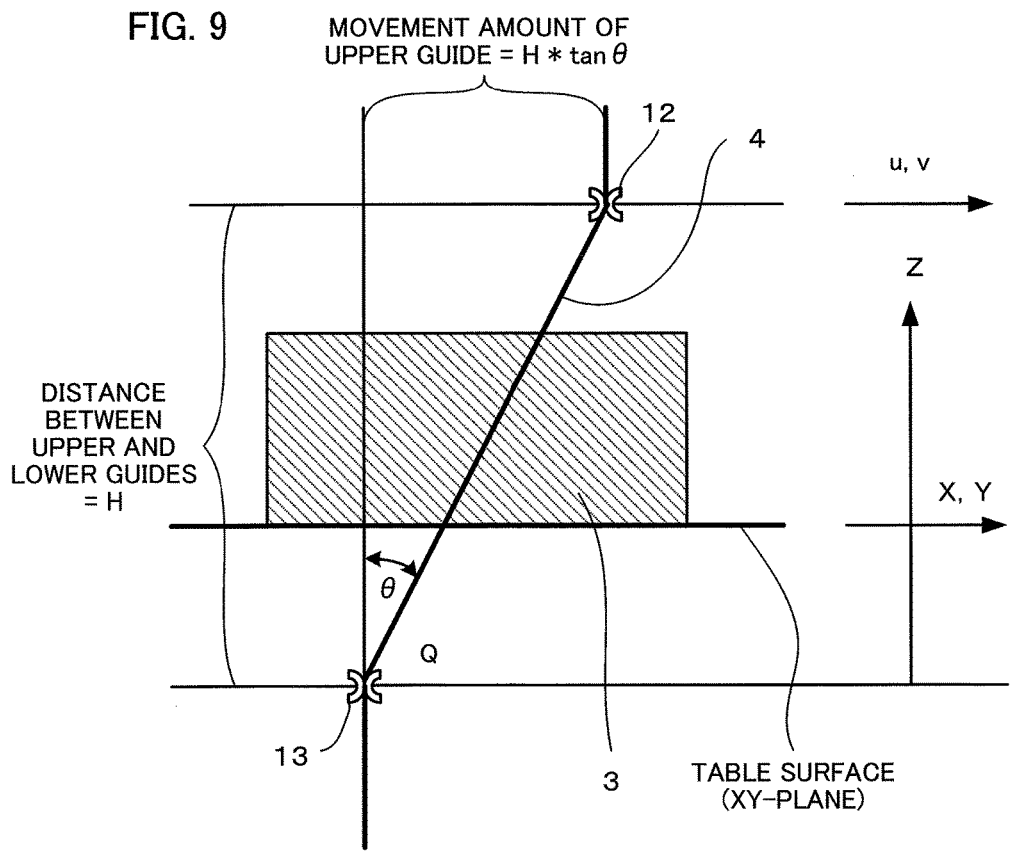
FIG. 9 is a diagram illustrating an angle command method for taper machining.
Figure 10:
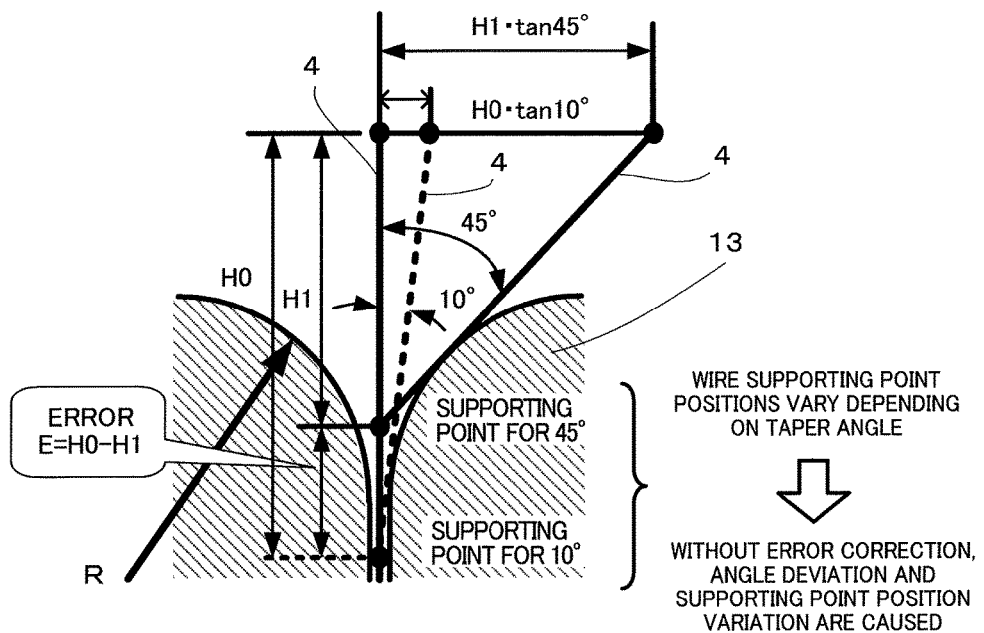
FIG. 10 is a diagram illustrating a supporting point error to be produced with use of the wire guide with a large curvature radius.
Figure 11:
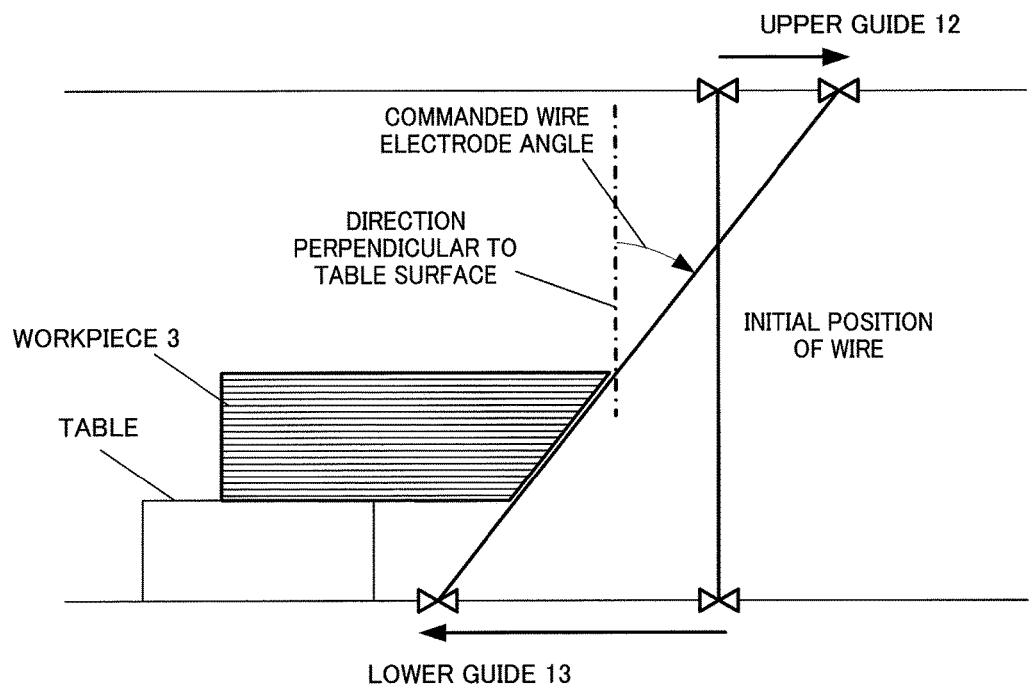
FIG. 11 is a diagram illustrating that if a commanded taper angle is great, the amount of movement of an upper and/or lower guide increases and the movable range of the guide may be exceeded so that machining is prevented.

Although the machining with a single taper angle is illustrated in the foregoing example for ease of description of the features of the present invention, machining with a plurality of taper angles, as shown in FIG. 5, should be performed as follows.

Figures 17, 18:
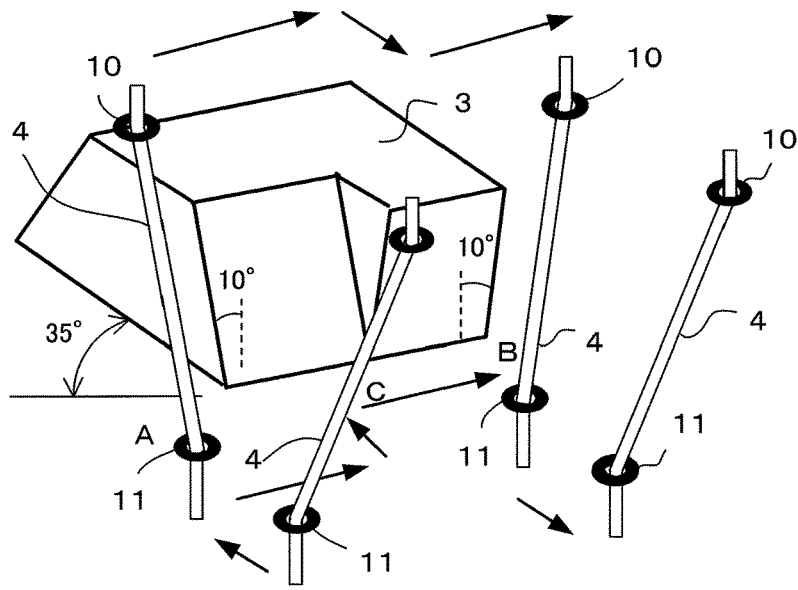
FIG. 17 is a diagram illustrating the taper machining performed by the wire electric discharge machine according to the present invention, in which the workpiece to be taper-machined has a plurality of (or two) taper angles.
FIG. 18 shows an example of a machining program for the taper machining shown in FIG. 1.

If the taper machining according to the present invention is performed in such a manner that the workpiece 3 shown in FIG. 5 is tilted at 35° (=(45+25)/2), which is an average between 45° and 25°, to the table surface, as shown in FIG. 17, then the wire electrode 4 will be tilted at ±10° to the vertical direction, at the most. Although the wire electrode 4 being machined cannot maintain a completely vertical state, it is evident that efficient and precise machining can be achieved under less influence of the problems (I) to (V) than the conventional taper machining in which the wire electrode 4 can be tilted to the maximum angle of 45°.

As seen from FIG. 17, the workpiece 3 shown in FIG. 5 is rotated about the Y-axis to be tilted at 35° from the table surface (XY-plane) of the machine. When the aforesaid machining program is executed based on the X'Y'Z'-coordinate system, a linear block A-C having been conventionally machined as a 45° slope, as shown in FIG. 5, is a surface tilted at 10° from a plane perpendicular to the table surface, on the left side with respect to the direction of movement of the wire electrode 4, in the case of the taper machining according to the present invention shown in FIG. 17. On the other hand, a linear block C-B having been conventionally machined as a 25° slope is a surface tilted at 10° from the plane perpendicular to the table surface, on the right side with respect to the direction of movement of the wire electrode 4. This coordinate system can be transformed by only creating a machining program (O0004) shown in FIG. 18, which comprises G134W1 and G134W0 added to the conventional machining program (O0002) shown in FIG. 6.

The following is a description of a motion based on the machining program (O0004) shown in FIG. 18.

First, the coordinate system transformation function is enabled by the command G134W1. Thereupon, the X'Y'Z'-coordinate system for the taper machining according to the present invention is set, and the wire electrode 4 is tilted perpendicular to an X'Y'-plane at the machining start point. The coordinate system tilt angle is commanded by S. Since S35.0 is given in this case, the coordinate system is tilted at 35°.

If the wire electrode 4 becomes perpendicular to the X'Y'-plane, M15 is commanded so that the taper machining function is enabled, and the coordinate system for the machining programs and the machining start point (0,−5) are set by G92. At the machining start point, the wire electrode 4 extends perpendicular to the X'Y'-plane.

In response to the command G01X-5.0, the wire electrode 4 starts to move toward the point A. In response to G51 and T45.0 commanded at the same time with G01X-5.0, the posture of the wire electrode 4 starts to change to prepare for machining in the next block (linear block A-C). When the point A is reached, the wire electrode 4 assumes a posture tilted at 10° on the left side with respect to the direction of movement of the wire electrode 4 in the next block. When Y30.0 is then commanded, the wire electrode 4 advances to the point C without changing its posture.

When the wire electrode 4 reaches the point C, the wire electrode 4 is tilted at 10° on the right side with respect to the direction of movement of the wire electrode 4 by T25.0. When Y30.0 is then commanded, slope machining is started with the wire electrode 4 kept tilted at 10° on the right side with respect to the direction of movement, and the wire electrode 4 advances to the point B. Then, in response to the command X5.0, the wire electrode 4 starts to move toward the machining end point. In response to G50 and T0 commanded at the same time with X-5.0, the posture of the wire electrode 4 starts to be gradually restored so that it is perpendicular to the X'Y'-plane. When the machining end point is reached, the wire electrode 4 is restored to the state where it extends perpendicular to the X'Y'-plane.

Finally, the coordinate system transformation function is disabled by the command G134W0, and the wire electrode 4 is restored to the state where it extends perpendicular to the table surface, whereupon the processing ends.

The following is a description of a method for mounting the workpiece 3 on the table.

Figure 1:
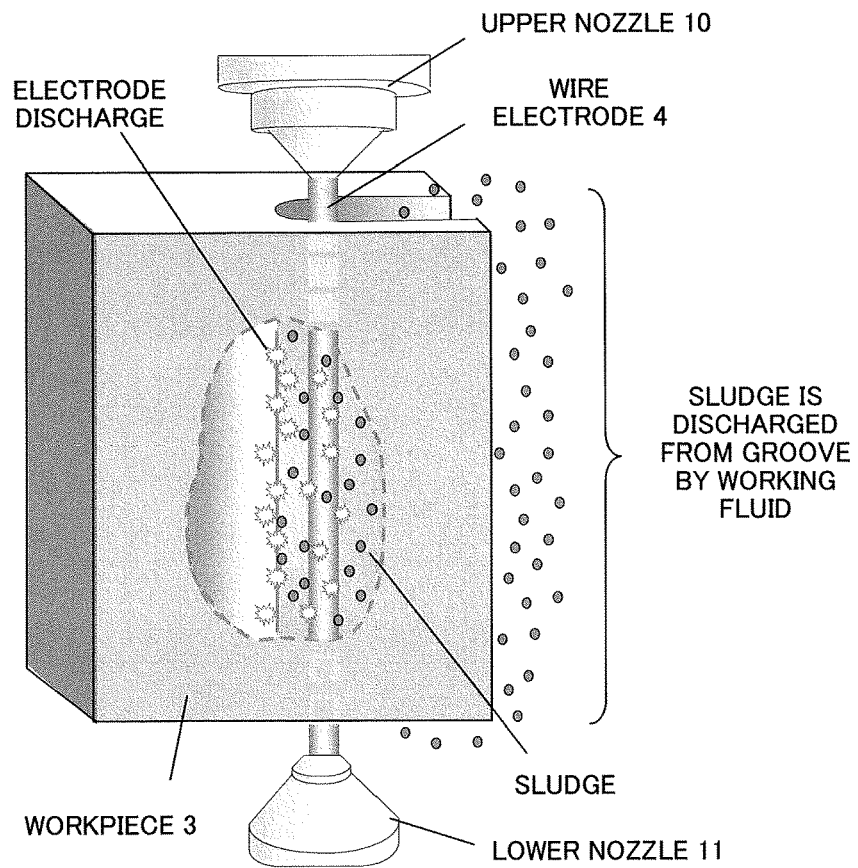
FIG. 1 is a diagram illustrating electric discharge machining using a wire electrode.
Figure 2:
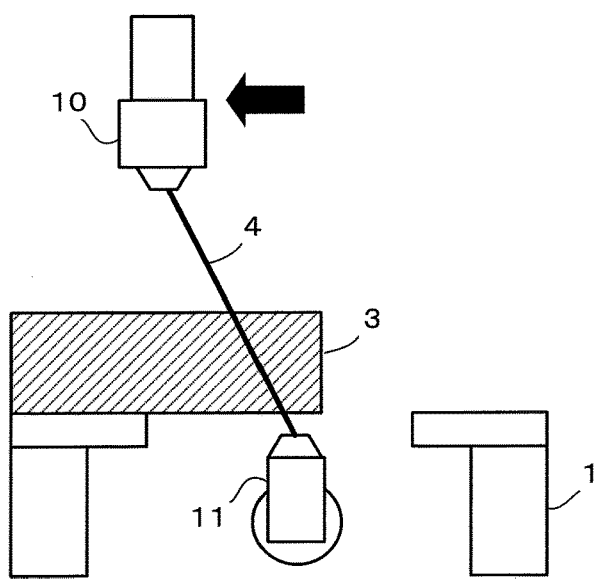
FIG. 2 is a diagram illustrating a machining example based on conventional taper machining.
Figure 19:
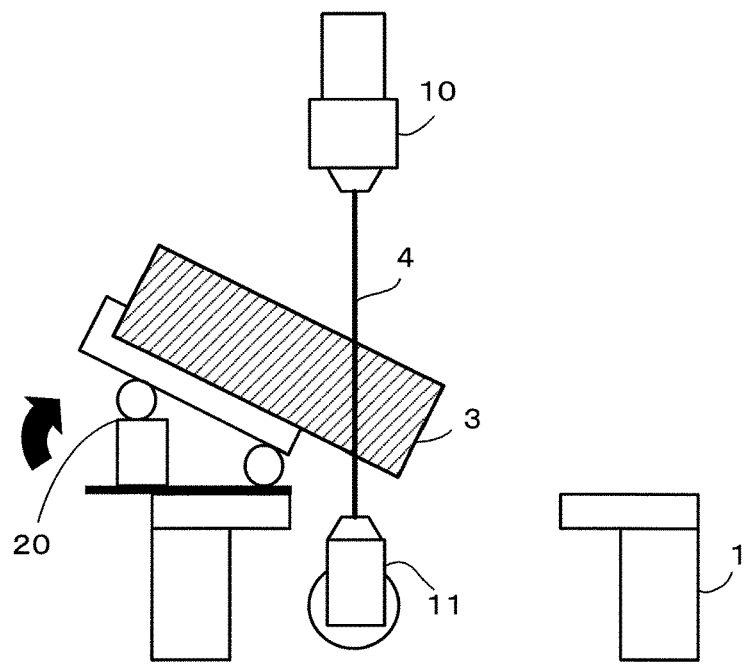
FIG. 19 is a diagram illustrating an example of taper machining executed with the workpiece tilted by means of a workpiece fixing jig having a sine-bar structure.

In contrast with the example of the taper machining without coordinate system transformation shown in FIG. 2, a method is considered in which the workpiece 3 is secured to the table by means of a dedicated jig (sine-bar structure 20) capable of angle adjustment, as shown in FIG. 19. Thus, machining may be performed after mounting the workpiece 3 on the jig and precisely adjusting the tilt angle at the time of prearrangement. According to this method, the prearrangement and the like are time-consuming. If the machining is performed efficiently and in a time-saving manner, however, the tilt angle of the workpiece 3 relative to the table surface may be measured by means of a probe mounted on the upper wire guide.

Figure 20:
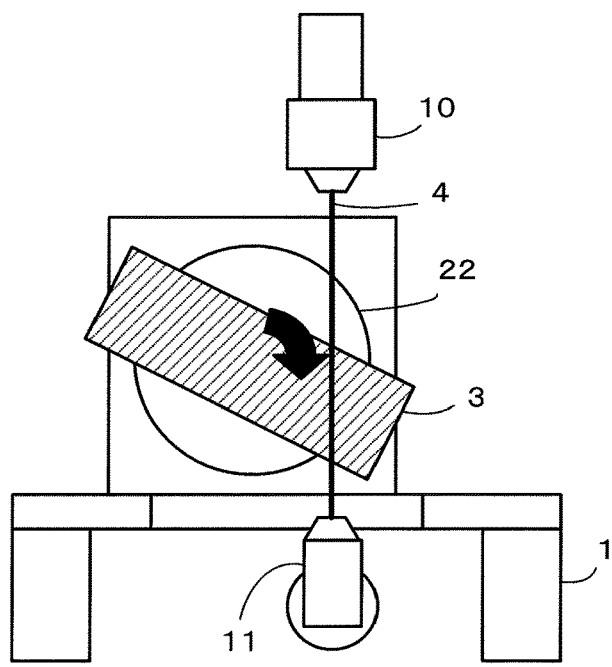
FIG. 20 is a diagram illustrating an example of taper machining executed with the workpiece mounted on a rotary indexing axis, which is located on the table and has an indexing and positioning function, and tilted by rotating the indexing axis.

As shown in FIG. 20, moreover, the tilt angle may be determined by mounting the workpiece 3 on a rotary indexing axis 22, which is located on the table and has an indexing and positioning function, and rotating the indexing axis 22. In this case, the tilt angle may be measured by the probe or settled using the positioning function of the rotary indexing axis 22. An index machine may be used in place of the rotary indexing axis 22.

The tilt angle of the workpiece 3 settled in this manner is input as a tilt angle of the coordinate system to the controller of the wire electric discharge machine, by means of the arguments S45.0 or S35.0 of the machining program in the aforementioned example or by manual input or automatic software setting. If this is done, the wire guide can be moved to a position where the wire electrode 4 and the workpiece 3 are perpendicular to each other by wire guide positioning means provided in the controller (based on a prior art technique such as the one described in Japanese Patent Application Laid-Open No. 2-139129). Thus, the taper machining according to the present invention can be performed.

In the example described above, the machining is such that the X-axis is tilted (X→X', Y=Y'). It is to be understood, however, that a desired tilt angle can be settled to achieve correct transformation of the coordinate system even in the case of machining with the Y-axis tilted (X=X', Y→Y') or machining with both the X- and Y-axes tilted (X→X', Y→Y').

Figure 21:
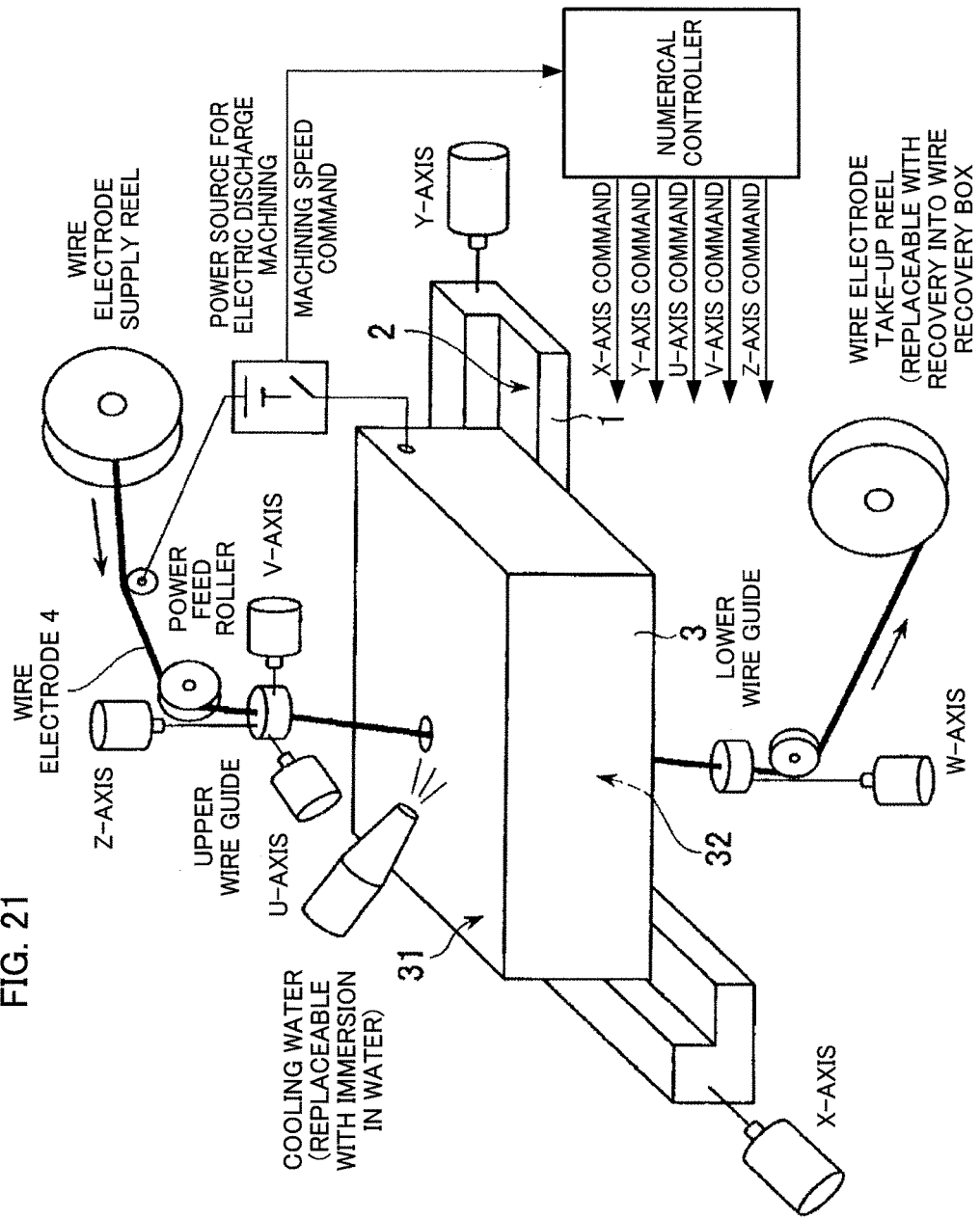
FIG. 21 is a diagram illustrating the basic configuration and operation of one embodiment of the wire electric discharge machine according to the present invention.

FIG. 21 is a diagram illustrating the basic configuration and operation of one embodiment of the wire electric discharge machine according to the present invention.

In FIG. 21, reference numeral 1 denotes a workpiece table on which a workpiece 3 to be machined is set and fixed. The workpiece table 1 has an upward workpiece mounting surface 2 with high-precision flatness. During machining, the workpiece 3 is set and fixed on the workpiece table 1 so that its bottom surface contacts the workpiece mounting surface 2.

The workpiece 3 has its entire upper surface 31 parallel to its bottom surface 32. In this example, the workpiece 3 is a cuboid structure, the entire upper surface 31 of which is parallel to the bottom surface 32. Alternatively, however, the workpiece 3 may be constructed so that only a part of the upper surface 31 is parallel to the bottom surface 32. A wire electrode 4 for electric discharge machining on the workpiece 3 is delivered from a supply reel and fed through a power feed roller, upper wire guide 12, etc. During machining, the wire electrode 4 is stretched between upper and lower wire guides 12 and 13 by wire connection, and a voltage (pulsing voltage) for electric discharge is applied between the wire electrode 4 and the workpiece 3.

Further, the wire electrode 4 is fed through the lower wire guide 13, guide rollers, etc., and taken up by a take-up reel, which pulls the wire electrode with a predetermined tension. In some cases, the wire electrode may be pulled between two rotating rollers used in place of the take-up reel as it is recovered into a wire recovery box.

Furthermore, there is an available method (a detailed description of which is omitted) in which cooling water is introduced to a portion to be machined or the entire workpiece 3 is immersed into a working fluid (e.g., pure water). The workpiece mounting surface 2 of the workpiece table 1 extends in the horizontal direction (on a plane parallel to the XY-plane), and the workpiece table 1 can be driven on the plane parallel to the XY-plane by servomotors for the X- and Y-axes. Further, the upper wire guide 12 can be driven on the plane parallel to the XY-plane by servomotors for the U- and V-axes, and in addition, driven in a direction (±Z-direction) perpendicular to the XY-plane by a servomotor for the Z-axis. The direction of movement along the U-axis is parallel to the X-axis, and the direction of movement along the V-axis is parallel to the Y-axis.

The portion to be machined can be changed by only changing the relative position of the workpiece 3 with respect to the wire electrode 4, and the direction of a machined cross-section is changed if the stretching direction of the wire electrode 4 is changed. These changes can be achieved by appropriately combining the movements of the X-, Y-, U-, V-, and Z-axes. The movements of these axes are achieved in response to commands for the respective axes (X-, Y-, U-, V-, and Z-axis commands) output from the numerical controller, and the contents of the commands are normally defined by machining programs. The numerical controller has a conventional configuration, comprising a CPU, memory, servo control unit, various interfaces, etc., a detailed description of which is omitted. The memory of the numerical controller is preloaded with machining conditions provided for each plate thickness, plate thickness correction means (calculation formula) for correcting the plate thickness of a workpiece by a tilt angle, and a machining program and its associated data. The plate thickness is corrected based on the tilt angle of the workpiece using the wire electric discharge machine shown in FIG. 21. The workpiece can be machined according to the corrected machining conditions.

Figure 22:
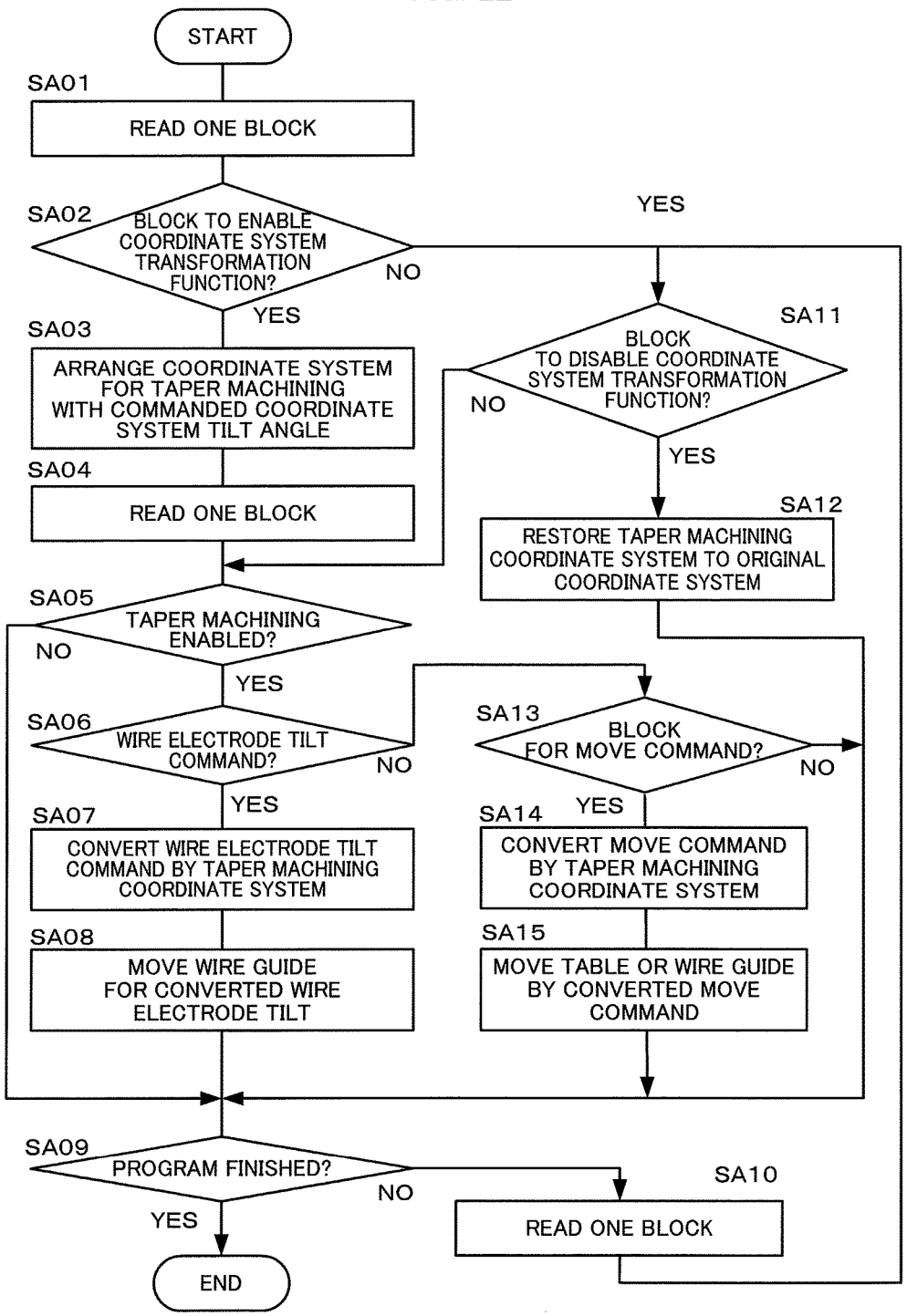
FIG. 22 is a flowchart illustrating a first embodiment of the taper machining processing executed by a numerical controller shown in FIG. 21.

FIG. 22 is a flowchart illustrating a first embodiment of taper machining processing executed by the numerical controller shown in FIG. 21. The workpiece is assumed to be previously set and fixed obliquely.

[Step SA01] One block of the machining program is read.

[Step SA02] It is determined whether or not the read block is one that enables the coordinate system transformation function. If the block is determined to be such one, the program proceeds to Step SA03. If not, the program proceeds to Step SA11.

[Step SA03] A coordinate system for taper machining is arranged with a commanded coordinate system tilt angle.

[Step SA04] One block of the machining program is read.

[Step SA05] It is determined whether or not the taper machining is enabled. If the taper machining is enabled, the program proceeds to Step SA06. If not, the program proceeds to Step SA09. If M15 is described in the read block in Step SA05, it is determined that the taper machining is enabled. M15 is previously stored as modal information, which is handled thereafter as taper-machining-enabled information for a period before a block in which the taper machining is described as disabled.

[Step SA06] It is determined whether or not there is a command for the tilt of the wire electrode. If there is a tilt command, the program proceeds to Step SA07. If not, the program proceeds to Step SA13.

[Step SA07] The wire electrode tilt command is converted by means of the taper machining coordinate system arranged in Step SA03.

[Step SA08] The wire guide is moved so that the wire electrode is tilted according to the command converted in Step SA07.

[Step SA09] It is determined whether or not the program is finished. If the program is finished, this processing ends. If not, the program proceeds to Step SA10.

[Step SA10] One block of the machining program is read.

[Step SA11] It is determined whether or not the block read in Step SA10 is one that disables the coordinate system transformation function. If the block is determined to be such one, the program proceeds to Step SA12. If not, the program returns to Step SA05.

[Step SA12] The taper machining coordinate system is restored to the original coordinate system.

[Step SA13] It is determined whether or not the read block is a block for a move command. If the read block is a move command block, the program proceeds to Step SA14. If not, the program returns to Step SA09.

[Step SA14] The move command is converted by means of the taper machining coordinate system.

[Step SA15] The table or the wire guide is moved in response to the move command converted in Step SA14.

The problems (I) to (IV) can be solved by the processing described above. In the machining program shown in FIG. 16, however, the coordinate system transformation function is enabled by the command G134W1, the X'Y'Z'-coordinate system for the taper machining is set, and the wire electrode is tilted so that it extends perpendicular to the X'Y'-plane at the machining start point. Therefore, the program (V) is not solved yet.

Figure 23:
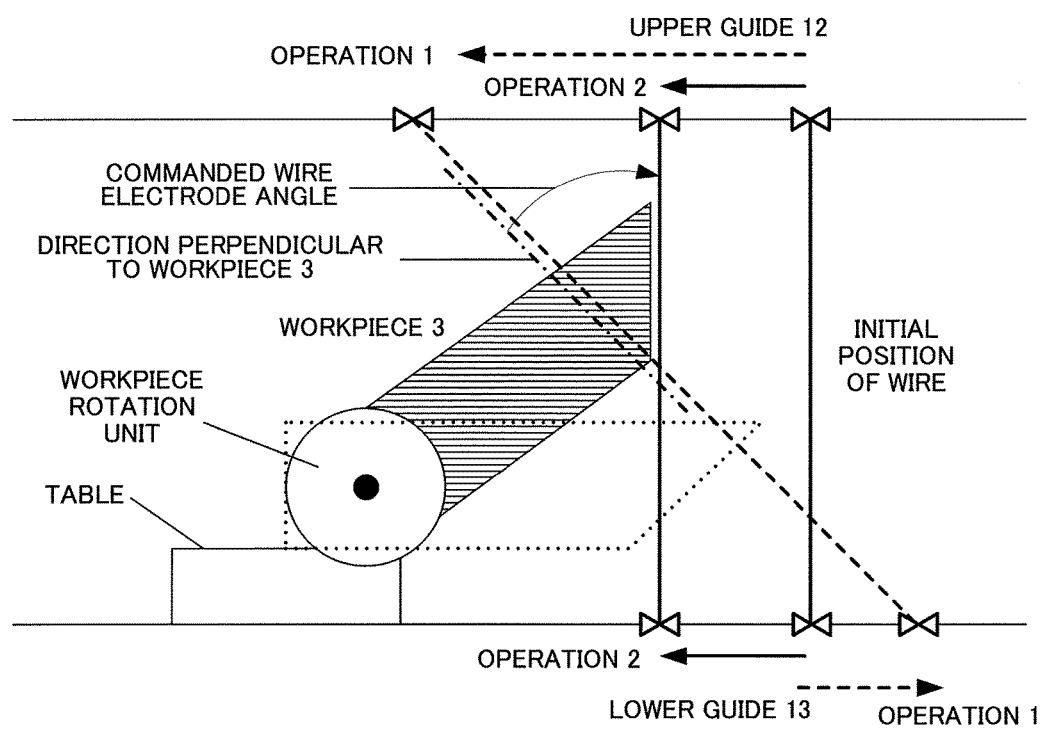
FIG. 23 is a diagram illustrating the basic configuration and operation of another embodiment of the wire electric discharge machine according to the present invention.
Figure 24:
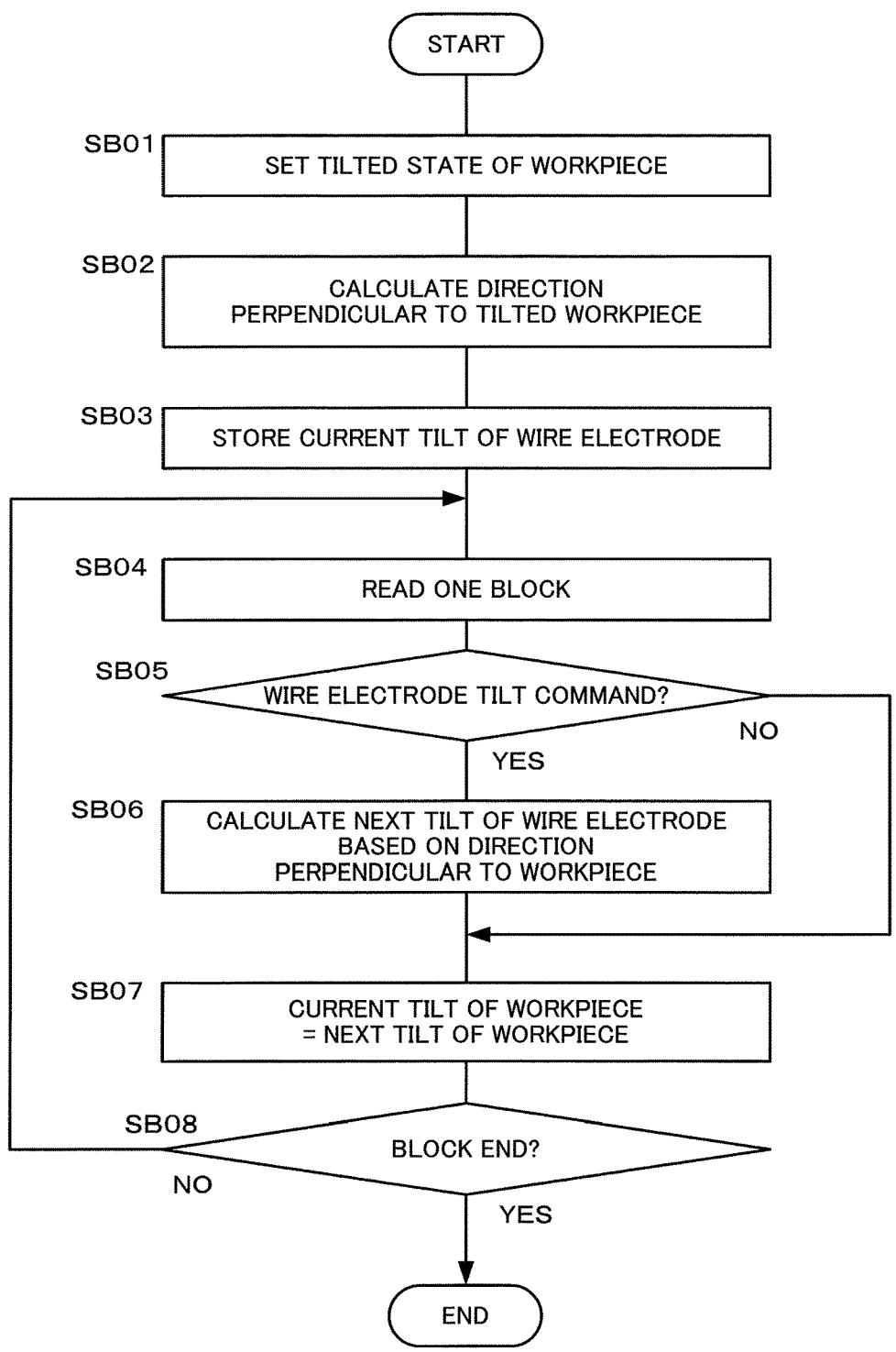
FIG. 24 is a flowchart illustrating a second embodiment of the taper machining processing executed by the numerical controller shown in FIG. 21.

Referring now to FIGS. 23 and 24, there will be described how the problem (V) can be solved.

FIG. 23 is a diagram illustrating the basic configuration and operation of another embodiment of the wire electric discharge machine according to the present invention. This wire electric discharge machine can machine the workpiece with the wire electrode kept substantial perpendicular to the table surface.

The workpiece 3 is rotated and set in place such that its rotation angle is commanded according to the coordinate system tilt angle. If the coordinate system transformation function is enabled, the wire electrode is tilted so as to extend perpendicular to the rotated workpiece 3 at the machining start point (see OPERATION 1 in FIG. 23), so that the movable ranges of the upper and lower guides may possibly be exceeded. Therefore, the difference between the commanded taper angle and the current angle of the wire electrode on the transformed coordinate system is calculated by a machining command correction unit attached to the controller of the wire electric discharge machine, and the wire guide is controlled based on the calculated difference. Thus, the wire electrode 4 can be kept substantially perpendicular to the table surface as it is moved (see OPERATION 2 in FIG. 23), so that the upper and lower guides can be prevented from exceeding the movable ranges.

FIG. 24 is a flowchart illustrating a second embodiment of the taper machining processing executed by the numerical controller shown in FIG. 21. Various steps of operation will be described with reference to FIG. 23. This flowchart is based on a machining program including a block that enables the coordinate system transformation function.

[Step SB01] The tilt of the workpiece is set by, for example, means shown in FIG. 20.

[Step SB02] A direction perpendicular to the tilted workpiece is determined by calculation.

[Step SB03] The current tilt of the wire electrode is stored. According to the operation mode of the wire electric discharge machine shown in FIG. 23, the current tilt of the wire electrode is equal to the commanded taper angle.

[Step SB04] One block is read.

[Step SB05] It is determined whether or not the wire electrode tilt command is included in the read block. If the tilt command is included, the program proceeds to Step SB06. If not, the program proceeds to Step SB07.

[Step SB06] The tilt of the wire electrode in the next processing period is calculated based on the direction perpendicular to the workpiece.

[Step SB07] The tilt of the wire electrode in the next processing period is set as the tilt of the wire electrode in the current processing period.

[Step SB08] It is determined whether or not the execution of the block read in Step SB04 is finished. If the execution is not finished, the program returns to Step SB04. If the execution is finished, the processing ends.

The invention claimed is:

1. A wire electric discharge machine which is provided with a table having a flat surface and a coordinate system based on two orthogonal axes and adapted to carry a workpiece thereon and which performs electric discharge machining while relatively moving a wire electrode and the workpiece according to a machining program for taper machining, the wire electric discharge machine comprising:
a mounting unit configured to mount the workpiece at an angle to the flat surface;
a tilt angle setting unit configured to set a tilt angle of the workpiece, mounted at an angle to the flat surface, with respect to the flat surface;
a coordinate system transformation unit configured to transform the coordinate system by tilting the coordinate system based on the tilt angle; and
a machining command value correction unit configured to correct a machining command value commanded by the machining program, based on the transformed coordinate system.

2. The wire electric discharge machine according to claim 1, wherein if a single taper angle is commanded by the machining program, the angle at which the workpiece is tilted relative to the flat surface by the mounting unit is equal to or in the vicinity of the angle of a taper portion commanded by the machining program.

3. The wire electric discharge machine according to claim 1, wherein if a plurality of taper angles are commanded by the machining program, the angle at which the workpiece is tilted relative to the flat surface by the mounting unit is equal to or in the vicinity of an angle intermediate between maximum and minimum values of the taper angle.

4. The wire electric discharge machine according to claim 1, wherein the mounting unit is an adjustable-angle index machine, a rotary axis having an indexing and positioning function, or a fixing jig having a sine-bar structure.

5. The wire electric discharge machine according to claim 1, further comprising a machining condition storage unit configured to store machining conditions prepared for each plate thickness of the workpiece, a plate thickness correction unit configured to correct the plate thickness of the workpiece based on the tilt angle set by the tilt angle setting unit, and a machining condition setting unit configured to set the machining conditions based on the plate thickness corrected by the plate thickness correction unit.

6. The wire electric discharge machine according claim 1, wherein the machining command value correction unit calculates an angle difference between a commanded taper angle and a current angle of the wire electrode on the coordinate system transformed by the coordinate system transformation unit, and a wire guide is moved based on the calculated angle difference.

7. The wire electric discharge machine according to claim 1, wherein the coordinate system transformation unit is configured to transform the coordinate system by tilting the coordinate system based on the tilt angle of the work piece.

8. The wire electric discharge machine according to claim 1, wherein the wire electric discharge machine is configured such that the workpiece is tilted relative to the flat surface when the workpiece is mounted to the flat surface by the mounting unit.

9. The wire electric discharge machine according to claim 1, wherein the wire electric discharge machine is configured to change an angular relationship of the workpiece relative to the flat surface when the workpiece is mounted to the wire electric discharge machine.

10. The wire electric discharge machine according to claim 2, wherein the mounting unit is an adjustable-angle index machine, a rotary axis having an indexing and positioning function, or a fixing jig having a sine-bar structure.

11. The wire electric discharge machine according to claim 3, wherein the mounting unit is an adjustable-angle index machine, a rotary axis having an indexing and positioning function, or a fixing jig having a sine-bar structure.

12. The wire electric discharge machine according to claim 2, further comprising a machining condition storage unit configured to store machining conditions prepared for each plate thickness of the workpiece, a plate thickness correction unit configured to correct the plate thickness of the workpiece based on the tilt angle set by the tilt angle setting unit, and a machining condition setting unit configured to set the machining conditions based on the plate thickness corrected by the plate thickness correction unit.

13. The wire electric discharge machine according to claim 3, further comprising a machining condition storage unit configured to store machining conditions prepared for each plate thickness of the workpiece, a plate thickness correction unit configured to correct the plate thickness of the workpiece based on the tilt angle set by the tilt angle setting unit, and a machining condition setting unit configured to set the machining conditions based on the plate thickness corrected by the plate thickness correction unit.

14. The wire electric discharge machine according to claim 4, further comprising a machining condition storage unit configured to store machining conditions prepared for each plate thickness of the workpiece, a plate thickness correction unit configured to correct the plate thickness of the workpiece based on the tilt angle set by the tilt angle setting unit, and a machining condition setting unit configured to set the machining conditions based on the plate thickness corrected by the plate thickness correction unit.

15. The wire electric discharge machine according to claim 2, wherein the machining command value correction unit calculates an angle difference between a commanded taper angle and a current angle of the wire electrode on the coordinate system transformed by the coordinate system transformation unit, and a wire guide is moved based on the calculated angle difference.

16. The wire electric discharge machine according to claim 3, wherein the machining command value correction unit calculates an angle difference between a commanded taper angle and a current angle of the wire electrode on the coordinate system transformed by the coordinate system transformation unit, and a wire guide is moved based on the calculated angle difference.

17. The wire electric discharge machine according to claim 4, wherein the machining command value correction unit calculates an angle difference between a commanded taper angle and a current angle of the wire electrode on the coordinate system transformed by the coordinate system transformation unit, and a wire guide is moved based on the calculated angle difference.

18. The wire electric discharge machine according to claim 5, wherein the machining command value correction unit calculates an angle difference between a commanded taper angle and a current angle of the wire electrode on the coordinate system transformed by the coordinate system transformation unit, and a wire guide is moved based on the calculated angle difference.

19. A device, comprising:
a wire electric discharge machine which is provided with a table having a flat surface and a coordinate system based on two orthogonal axes and adapted to carry a workpiece thereon and configured to execute electric discharge machining while relatively moving a wire electrode and the workpiece according to a machining program for taper machining, wherein the machine is configured to support the workpiece at various angles relative to the flat surface during electric discharge machining, the machine including:
a tilt angle setting unit configured to set a tilt angle of the workpiece, mounted at an incline angle to the flat surface, with respect to the flat surface, while the wire electrode is orthogonal to the flat surface;
a coordinate system transformation unit configured to transform the coordinate system by tilting the coordinate system based on the tilt angle; and
a machining command value correction unit configured to correct a machining command value commanded by the machining program, based on the transformed coordinate system.

20. The wire electric discharge machine according to claim 19, wherein the wire electric discharge machine includes a rotary index machine configured to change an angular relationship of the workpiece relative to the flat surface when the workpiece is supported by the wire electric discharge machine.

\* \* \* \* \*